United States Patent
Deubler, Jr.

(10) Patent No.: US 8,041,396 B2
(45) Date of Patent: Oct. 18, 2011

(54) METHOD AND SYSTEM FOR EMERGENCY DIALING OF A WIRELESS COMMUNICATION DEVICE

(75) Inventor: Donald L. Deubler, Jr., Lake Forest, IL (US)

(73) Assignee: Firefly Communications, Inc., Miami Beach, FL (US)

( * ) Notice: Subject to any disclaimer, the term of this patent is extended or adjusted under 35 U.S.C. 154(b) by 275 days.

(21) Appl. No.: 10/742,238

(22) Filed: Dec. 18, 2003

(65) Prior Publication Data

US 2004/0137938 A1    Jul. 15, 2004

Related U.S. Application Data

(60) Provisional application No. 60/435,819, filed on Dec. 20, 2002.

(51) Int. Cl.
*H04B 1/38* (2006.01)

(52) U.S. Cl. ............... 455/564; 455/404.1; 455/401; 379/216.01; 379/359

(58) Field of Classification Search ........... 455/550.1, 455/575.1, 564, 565, 566, 567, 90.3, 344, 455/404.2, 404.1, 56, 401; 379/433.07, 433.06, 379/216.01, 359
See application file for complete search history.

(56) References Cited

U.S. PATENT DOCUMENTS

| | | | |
|---|---|---|---|
| D197,466 S | 2/1964 | Spilman et al. | D26/14 |
| D219,028 S | 10/1970 | Miller et al. | D26/13 |
| 4,769,836 A | 9/1988 | Aihara | |
| 4,980,910 A | 12/1990 | Oba et al. | |
| 5,029,196 A | 7/1991 | Morganstein | |

(Continued)

FOREIGN PATENT DOCUMENTS

WO    WO00/69153    *    9/2000

(Continued)

OTHER PUBLICATIONS

Moriguchi et al. Signal Conversion Device, Servier Device, Network Information System and Control Methods for Them, and Telephone Terminal Device WO 01/10103 A1 Feb. 8, 2001.*

(Continued)

*Primary Examiner* — Patrick N Edouard
*Assistant Examiner* — Justin Y Lee
(74) *Attorney, Agent, or Firm* — Law Office of Donald D. Mondul

(57) ABSTRACT

A wireless communication device may have several contact buttons, including, for example, a Mom button, a Dad button and a Home button. The device may also have a Send button and an End button. A child may press one of the contact buttons, then dial Send, and a call will be placed to the specifically denoted contact. Accordingly, a child may easily and efficiently use the present invention to quickly wirelessly communicate with another person, without the confusion of extraneous buttons. The wireless communication device also includes a system and method for emergency dialing. Emergency dialing is effected by pressing an emergency call button and the Send button. In this manner, accidental dialing of an emergency number is avoided. The wireless device can be remotely programmed such that a parent or other person may remotely program the numbers called when the contact buttons are pressed. Accordingly, if a parent or other person plan to change locations, the device may be remotely reprogrammed with a different contact number for that parent. The wireless communication device may be reprogrammed via a telephone call from a remote location or from a computer via the Internet.

6 Claims, 14 Drawing Sheets

U.S. PATENT DOCUMENTS

| | | | |
|---|---|---|---|
| 5,054,051 A | 10/1991 | Hoff | |
| 5,099,507 A | 3/1992 | Mukai et al. | |
| 5,351,051 A | 9/1994 | Yano et al. | 341/176 |
| D351,173 S | 10/1994 | Yeh | D14/218 |
| D351,828 S | 10/1994 | Pucci et al. | D13/168 |
| 5,365,570 A | 11/1994 | Boubelik | 379/59 |
| D354,489 S | 1/1995 | Patton et al. | D14/218 |
| D357,201 S | 4/1995 | Novack | D10/104 |
| D358,153 S | 5/1995 | Jackson | D14/245 |
| 5,455,857 A | 10/1995 | McGuire | |
| 5,467,388 A | 11/1995 | Redd, Jr. et al. | |
| 5,473,671 A | 12/1995 | Partridge, III | |
| 5,487,108 A | 1/1996 | Atkins et al. | |
| 5,499,288 A | 3/1996 | Hunt et al. | |
| 5,522,089 A | 5/1996 | Kikinis et al. | |
| D374,190 S | 10/1996 | Yuen | D10/114 |
| 5,561,705 A | 10/1996 | Allard et al. | |
| D375,696 S | 11/1996 | Seki et al. | D10/104 |
| D377,458 S | 1/1997 | Tsui | D10/104 |
| D379,009 S | 4/1997 | Osiecki | D14/167 |
| D379,456 S | 5/1997 | Osiecki | D14/167 |
| D380,694 S | 7/1997 | Seki et al. | D10/104 |
| 5,651,056 A | 7/1997 | Eting et al. | |
| 5,677,949 A | 10/1997 | Macor | |
| D391,878 S | 3/1998 | Alleyne | D10/104 |
| 5,742,666 A | 4/1998 | Alpert | 379/58 |
| 5,841,849 A | 11/1998 | Macor | |
| 5,864,603 A | 1/1999 | Haavisto et al. | |
| D406,131 S | 2/1999 | Osthues | D14/138 |
| D406,779 S | 3/1999 | Pinardi et al. | D10/104 |
| 5,894,591 A | 4/1999 | Tamayo | 455/31.2 |
| 5,929,777 A | 7/1999 | Reynolds | 340/825.49 |
| D412,455 S | 8/1999 | Greene | D10/104 |
| 5,999,996 A | 12/1999 | Dunn | |
| 6,035,217 A | 3/2000 | Kravitz | |
| 6,044,257 A | 3/2000 | Boling et al. | 455/404.2 |
| 6,055,439 A | 4/2000 | Helin et al. | |
| 6,115,597 A | 9/2000 | Kroll et al. | 455/404 |
| D431,486 S | 10/2000 | Iseli et al. | D10/106 |
| 6,167,251 A | 12/2000 | Segal et al. | |
| 6,173,171 B1 | 1/2001 | Plush et al. | |
| 6,173,194 B1 | 1/2001 | Vanttila | |
| 6,184,796 B1 | 2/2001 | Rivero et al. | |
| 6,198,914 B1 * | 3/2001 | Saegusa | 455/404.2 |
| 6,198,947 B1 | 3/2001 | Barber | |
| D440,954 S | 4/2001 | Boling et al. | D14/138 |
| D441,185 S | 5/2001 | Shimizu et al. | D3/207 |
| D441,524 S | 5/2001 | Shimizu et al. | D3/207 |
| D441,745 S | 5/2001 | Yabusaki | D14/247 |
| 6,226,510 B1 | 5/2001 | Biling et al. | 455/404.2 |
| 6,226,532 B1 | 5/2001 | Kim et al. | |
| 6,236,358 B1 | 5/2001 | Durst et al. | 342/357.09 |
| 6,240,303 B1 | 5/2001 | Katzur | |
| 6,243,039 B1 | 6/2001 | Elliot | 342/457 |
| 6,246,751 B1 | 6/2001 | Bergl et al. | |
| D446,780 S | 8/2001 | Sedan et al. | D14/137 |
| 6,289,084 B1 | 9/2001 | Bushnell | |
| 6,298,122 B1 | 10/2001 | Horne | |
| 6,298,131 B1 * | 10/2001 | Veschi | 379/355.06 |
| 6,310,609 B1 | 10/2001 | Morgenthaler | |
| 6,314,179 B1 | 11/2001 | Chen | |
| D452,684 S | 1/2002 | Sedan et al. | D14/137 |
| D453,332 S | 2/2002 | Herath | D14/341 |
| 6,356,258 B1 * | 3/2002 | Kato et al. | 345/168 |
| 6,370,363 B1 | 4/2002 | Fukuzato | |
| D459,314 S | 6/2002 | Flick | D13/168 |
| D460,953 S | 7/2002 | Argle et al. | D14/138 |
| 6,421,001 B1 | 7/2002 | Durst et al. | 342/357.07 |
| 6,424,706 B1 | 7/2002 | Katz et al. | |
| 6,449,496 B1 | 9/2002 | Beith et al. | |
| D469,708 S | 2/2003 | To et al. | D10/104 |
| 6,529,871 B1 | 3/2003 | Kanevsky et al. | |
| 6,535,726 B1 | 3/2003 | Johnson | |
| 6,553,222 B1 | 4/2003 | Weiss | |
| 6,567,671 B2 | 5/2003 | Amin | |
| D477,344 S | 7/2003 | Ng | D16/202 |
| D478,052 S | 8/2003 | Thomas, Jr. | D13/168 |
| D478,892 S | 8/2003 | Corander | D14/218 |
| D479,211 S | 9/2003 | Siddoway et al. | D14/137 |
| D480,056 S | 9/2003 | Arcieri | D13/168 |
| D481,321 S | 10/2003 | Knieriem et al. | D10/57 |
| D483,281 S | 12/2003 | Cobigo | D10/104 |
| 6,668,179 B2 * | 12/2003 | Jiang | 455/404.1 |
| 6,681,000 B1 * | 1/2004 | Moriguchi et al. | 379/90.01 |
| D486,806 S | 2/2004 | Takayama et al. | D14/137 |
| D486,807 S | 2/2004 | Takayama et al. | D14/137 |
| D487,065 S | 2/2004 | Murray | D13/168 |
| D488,811 S | 4/2004 | Denhez | D14/341 |
| 6,785,387 B1 | 8/2004 | Albrecht et al. | |
| D496,638 S | 9/2004 | Deubler, Jr. | |
| D496,639 S | 9/2004 | Deubler, Jr. | |
| 6,792,298 B1 * | 9/2004 | Tasto | 455/575.8 |
| 6,799,163 B2 | 9/2004 | Nolan | |
| 6,816,721 B1 | 11/2004 | Rudisill | |
| D508,028 S | 8/2005 | Deubler, Jr. | |
| 6,993,004 B2 * | 1/2006 | Boys | 370/338 |
| 7,020,269 B1 * | 3/2006 | Park et al. | 379/355.01 |
| 2002/0082042 A1 | 6/2002 | Mark et al. | |
| 2002/0106073 A1 | 8/2002 | Tevlin | |
| 2002/0141558 A1 | 10/2002 | Renner et al. | |
| 2002/0159571 A1 | 10/2002 | Stock | |
| 2003/0027606 A1 | 2/2003 | Tsai | 455/568 |
| 2003/0073426 A1 | 4/2003 | Chan et al. | |
| 2003/0081767 A1 | 5/2003 | Montague | 379/433.07 |
| 2003/0122784 A1 | 7/2003 | Shkolnikov | 345/169 |
| 2003/0236088 A1 | 12/2003 | Im | |
| 2004/0046637 A1 * | 3/2004 | Wesby Van Swaay | 340/5.1 |
| 2004/0101112 A1 | 5/2004 | Kuo | |
| 2004/0198455 A1 * | 10/2004 | Deeds | 455/566 |
| 2004/0208304 A1 | 10/2004 | Miller | |
| 2004/0229600 A1 | 11/2004 | Saez et al. | |
| 2004/0264666 A1 | 12/2004 | Guo et al. | |
| 2005/0085257 A1 * | 4/2005 | Laird et al. | 455/404.1 |
| 2006/0015819 A1 * | 1/2006 | Hawkins et al. | 715/780 |

FOREIGN PATENT DOCUMENTS

WO          2004/089011 A1         10/2004

OTHER PUBLICATIONS http://www.findarticles.com, LookSmart's FindArticles—Newsbytes News Network: Phone Adapter for Palm Pilot May 4, 1999, *Phone Adapter for Palm Pilot* May 4, 1999, /Wires Asia, Telecom, PC/, Copyright 1999 Newsbytes News Network, Copyright 2000 Gale Group, p. 1.

http://galenet.galegroup.com, Thomson Gale © 2005 by The Gale Group, Inc., *Organized time: personal digital assistants put power (and more) in the palm of your hand*, Business & Company Resource Center—News/Magazine Display Page, InfoWorld, Apr. 18, 1994 v16 n16 p. 81(14), Article A15319278, pp. 1-18.

Ismail Dalgic, et al., *True Number Portability and Advanced Call Screening in a SIP-Based IP Telephony System*, IEEE Communications Magazine, Jul. 1999, pp. 2-7.

http://ww.nuance.com, *Nuance's Speech Recognition Software Powers T-Mobile's Voice Activated Services*, pp. 1-4.

Jiri Navratil et al., *An Instantiable Speech Biometrics Module With Natural Language Interface: Implementation in the Telephony Environment*, IBM T.J. Watson Research Center, Yorktown Heights, NY 10598, USA, pp. 1097-1100.

http://galenet.galegroup.com, Thomson Gale © 2005 by The Gale Group, Inc.,*Getting online on the road with Bluetooth technology*, Business & Company Resource Center—News/Magazine Display Page, The America's Intelligence Wire, Jul. 7, 2003 pNA, Article A107667083, pp. 1-3.

Ismail Dalgic, et al., *True Number Portability and Advanced Call Screening in a SIP-Based IP Telephony System*, IEEE Communications Magazine, Jul. 1999, pp. 2-7.

\* cited by examiner

METHOD AND SYSTEM FOR EMERGENCY DIALING OF A WIRELESS COMMUNICATION DEVICE

This application claims priority to provisional application Ser. No. 60/435,819 filed on Dec. 20, 2002 and U.S. patent application Ser. No. 29/193,702 filed on Nov. 12, 2003. The subject matter of those applications is incorporated by reference herein.

BACKGROUND

1. Field of the Invention

The invention relates generally to wireless communication devices and, more particularly, to a method and system for wireless communication that may be used by children.

2. Description of Related Art

Increasingly, the use of wireless communication devices has become popular as wireless communication technology has provided for improved wireless communication devices at relatively lower prices. Presently, a wide variety of cellular phones and other wireless devices are available for use by consumers.

With regard to cellular phones, these devices typically include a large number of advanced and high-tech features that provide for a wide range of functionality for a large number of users. People regularly use cellular phones to chat with friends, to keep in contact with business associates while away from the office and in emergency situations.

Parents often find it convenient for their children to have cellular phones. Specifically, in a variety of emergency or other situations, children may use a cellular phone to call home or call their parents for assistance. Such situations typically include, for example, when a child becomes lost, needs to be picked up from school, or otherwise needs the assistance of a parent or someone from home. Presently available cellular phones, however, have certain deficiencies when used by children, and most particularly when used by smaller children.

One such deficiency is that many children have difficulty remembering phone numbers and/or have difficulty pressing the correct buttons (often eleven or more) in the correct order to properly initiate a call. This difficulty is typically increased if the child is panicked or otherwise nervous or scared. While many phones have preset speed dial numbers that allow for the dialing of a particular number with a single keystroke, the presence of a relatively large number of keys on the phone often makes these speed dials difficult for children to use. This situation is typically exacerbated by the presence of additional function keys on the cellular phone such as up arrow, down arrow, "#", "*" and others. In addition, the speed dial function is typically a secondary function for a button, and consequently, the speed dial keys are typically not labeled with anything other than a number or symbol, which is not related to the speed dial function. Accordingly, the name of the individual or place that the speed dial is calling is not readily apparent. In addition, while some cellular phones allow a person to scroll a cursor up and down an LCD or similar display with alphanumeric names, this type of scrolling function is also often difficult and cumbersome for children to use.

Another such deficiency is that some cellular phones incorporate emergency calling buttons that connect to a designated emergency call number (e.g. 911) with the press of a single button. Thus, a child may accidentally or through curiosity call the designated emergency number.

Furthermore, speed dial keys on cellular phones must typically be programmed from the phone itself. Accordingly, it is not possible for a parent to change a contact number while positioned at a location remote from the child and the cellular phone. Consequently, it is not possible for the parent to change locations and contact phone numbers when at a location remote from the child and cell phone.

In addition, the size, shape and layout of present cell phones make them cumbersome and awkward for use by children. Many of the phones are too large for use by children. Others are relatively small, but possess a shape that is difficult for a child to hold and/or use.

As an alternative to the above-discussed devices, there have been produced wireless devices that include a single "panic button" and allow a child (or typically an elderly person) to press the single button and wirelessly alert a central station that a problem exists. Deficiencies also exist, however, with these types of devices when used by children.

One such deficiency is that these "panic button" devices typically do not allow a child to initiate voice communications with personnel at the central station. As a consequence, a child may only wish to press the "panic button" in the face of an extreme emergency situation, such as an accident, and not in other cases when it otherwise might be convenient such as to get picked up from school. In addition, because the child cannot have voice communications with the central station (or with a parent), a "false alarm" or other erroneous push of the panic button cannot easily be mitigated and a full response will ensue nevertheless.

Another deficiency of the "panic button" systems is that the phone number to be dialed is typically hard programmed into the device, and reprogramming of the number to be called may not be easily accomplished. In addition, only a single number may typically be dialed when the "panic button" is depressed. As such, a need exists for an improved method and system for wireless communication.

SUMMARY

A wireless communication device that may be easily used by children is described herein to satisfy these needs. In one embodiment, the device may have several contact buttons or keys, including a Mom button, a Dad button and a Home button. The Device may also have a Send (or Talk) button and an End button. A child may press one of the contact buttons, then press Send, and a call will be placed to the specifically denoted contact. For example, if a child desires to call his mother so that he may be picked up from school, the child would simply push the Mom button, then the Send button. A call would be placed to the child's mother, and the two could talk and arrange for a pickup. At the end of the call, the child would press End. Likewise, a child can receive incoming calls by pressing the Send, Mom, Dad or Home buttons. Accordingly, a child may easily, efficiently and quickly wirelessly communicate with another person, without the confusion associated with extraneous buttons.

Another embodiment provides for a method and system for emergency dialing for use with a wireless communication device that can be easily used by children. The method and system for emergency dialing requires operation of two buttons to effectuate emergency dialing. This reduces the opportunity for emergency dialing by accident or as a curiosity by the child.

Another embodiment provides for remote programming of the wireless device such that a patent or other person may remotely program the numbers called when the contact buttons are pushed. Accordingly, if a parent or other person plans to change locations, the device may be remotely reprogrammed with a different contact number for that parent. The wireless communication device may be reprogrammed via a telephone call from a remote location or may be reconfigured from a computer via the Internet. The wireless communication device can also be reprogrammed through a serial connection to a personal computer or through use of a menu on the wireless communication device itself.

Accordingly, by way of a simple user interface with relatively few buttons, a child may easily contact his parents or others in an emergency or other situation. By providing for remote reprogramming of the phone numbers accessed by the wireless device, parents or others may conveniently reprogram contact numbers so that they may be contacted after changing locations. Thus, the various embodiments described herein overcome the limitations of present wireless communications devices.

Other objects and features will become apparent from the following detailed description, considered in conjunction with the accompanying system schematics and flow diagrams. It is understood, however, that the drawings, are solely for the purpose of illustration and not as a definition of the limits of the invention, for which reference should be made to the appended claims.

BRIEF DESCRIPTION OF THE DRAWING FIGURES

In the drawing figures, which are merely illustrative, and wherein like reference numerals depict like elements throughout the several views.

DETAILED DESCRIPTION OF EXEMPLARY EMBODIMENTS

There will now be shown and described in connection with the attached drawing figures several exemplary embodiments of a system and method for wireless communication.

Figure 1:
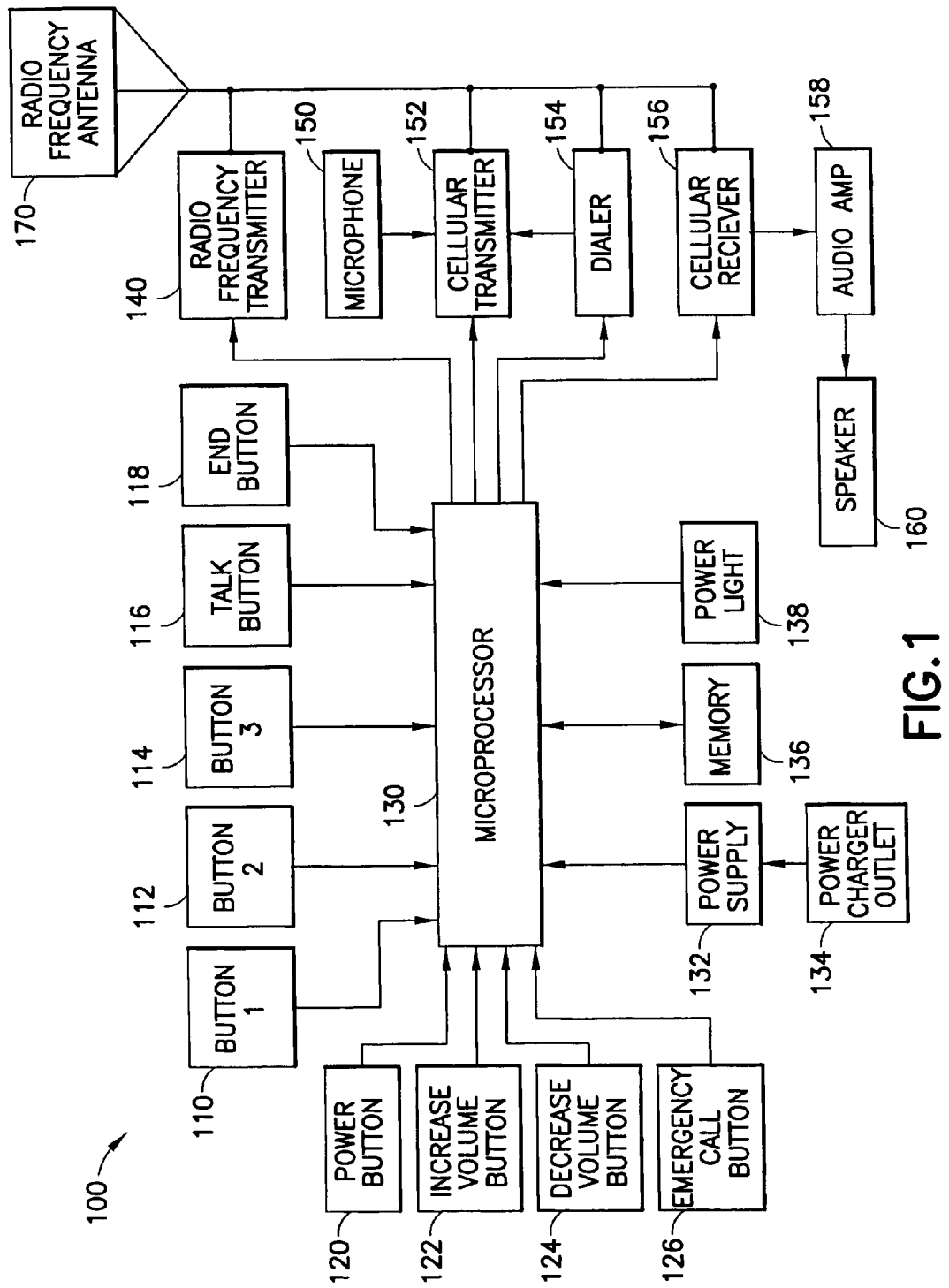
FIG. 1 is a schematic diagram of an overview of an exemplary embodiment of the system architecture of a wireless communication device.

With reference to FIG. 1, there is shown a schematic diagram of an overview of an exemplary embodiment of the system architecture of a wireless communication device. Wireless communication device 100 is shown having contact buttons 110, 112 and 114. In an exemplary embodiment, contact button 110 may be used to facilitate calling the child's "Home," contact button 112 may be used to contact another person such as, for example, the child's mother, or "Mom," and contact button 114 may be used to contact another person such as, for example, the child's father, or "Dad."

The contact buttons may have easily identifiable icons or symbols to facilitate easy dialing by a child. In addition, the identifying icons or symbols may be selectably changeable and/or removable such that the contact buttons may have different symbols or icons as dictated by the needs of the particular child. The symbols or icons may be selectable, by way of non-limiting example, by having removable and interchangeable buttons with icons thereon, removable identification labels, or other similar identifying methods. The communications device 100 may also have communications buttons 116, 118. The communication buttons may include Send (or Talk) button 116 and End button 118.

Communications device 100 may be controlled by Microprocessor 130 which facilitates and coordinates the electronic processes of wireless communications device 100 as is known by those skilled in the art. Wireless communication device 100 may also include a power button 120, for turning wireless communications device 100 on, increase volume button 122, for increasing the speaker volume, and decrease volume button 124, for decreasing the speaker volume of the device.

Wireless communication device 100 may include an emergency call button, 126. The emergency call button 126 is used in conjunction with the Send button to effectuate emergency dialing (e.g. causing the dialing of 911). In one embodiment, the emergency call button 126 is pressed and held down causing the emergency call number (i.e. 911) to appear on the display and the indicator light to glow red (the display and indicator light are described more fully later in this application), then the Send button is pressed while the emergency call button is held down and a call is placed to the emergency call number. This double trigger approach to emergency dialing reduces the chance of the child accidentally calling the emergency call number by pressing an emergency call button alone. The emergency call button on the wireless communication device may be labeled with an appropriate icon (e.g. a red cross).

Wireless communications device 100 may also have power supply 132, designed and configured as is known in the art. Power Supply 132 may work in conjunction with rechargeable or other batteries as is known by those skilled in the art, while an interface with power charger outlet 134 which may selectively be coupled with a power charging device such as a DC phone charger as is known by those skilled in the art.

Wireless communications device 100 may also have memory 136 which, when used in conjunction with microprocessor 130, may be used to store on board software and/or firmware programs to implement the functionality of the wireless communications device 100. Memory 136 may also include storage for phone numbers such as those which will be associated with the Home button 110, the Mom button 112, and the Dad button 114.

Wireless communications device 100 may also have power light 138 which will indicate when wireless communication device 100 has been turned on as is known by those skilled in the art. Power light 138 may also be used to indicate or signal other status conditions as determined by the programs executed by microprocessor 130.

Wireless communications device 100 may also have radio frequency antenna 170 which may, as needed, both receive and send radio frequency signals for wireless communication as is known by those skilled in the art. Signals received by a radio frequency antenna 170 may be processed by cellular receiver 156, amplified by audio amplifier 158 and, in turn, transmitted through speaker 160 such that an audible signal may be heard by a user.

The user may communicate with others by speaking into microphone 150, which when coupled with cellular transmitter 152 may wirelessly transmit a signal via radio frequency antenna 170 to other listeners. Dialer 154 may be used to facilitate the dialing functionality of the wireless communications device 100 as is known by those skilled in the art.

While wireless communication device 100 is described herein as being a cellular communication device, and specifically a cell phone, wireless communication device may be designed, in accordance with the present invention, to transmit signals via any wireless means now known, or hereafter developed, as guided by the present disclosure, as interpreted by a person skilled in the art.

Figure 2:
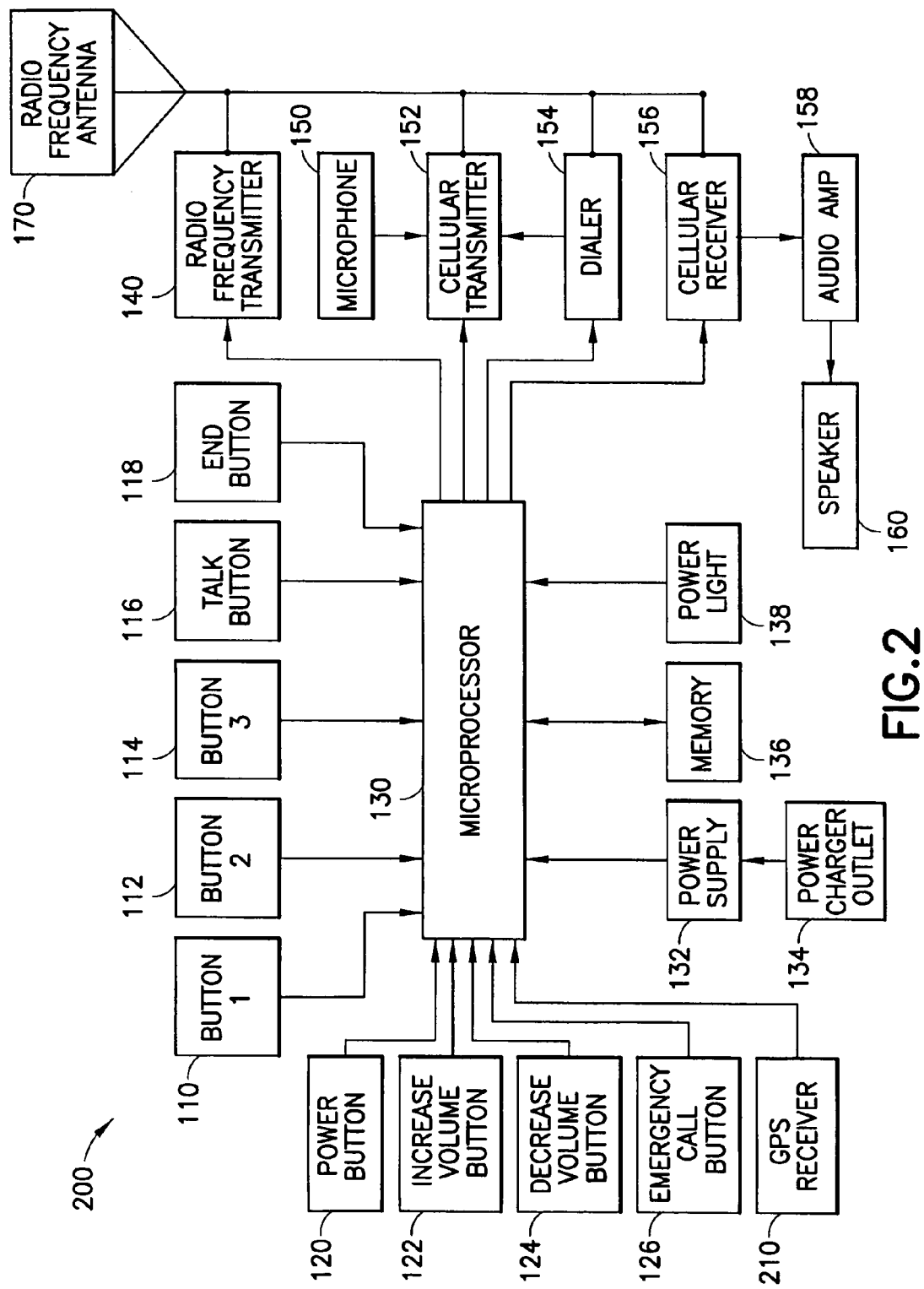
FIG. 2 is a schematic diagram of an overview of another exemplary embodiment of the system architecture of a wireless communication device.

With reference to FIG. 2, there is shown wireless communications device 200, which may include the same components as those referenced with regard to wireless communications device 100. In addition, wireless communications device 200 may also have a global positioning satellite ("GPS") receiver 210 coupled to microprocessor 130. GPS receiver 210 may be used to provide positioning information for wireless communications device 200 and consequently, the child using wireless communications device 200, such that wireless communications device 200 and the child using it may be readily located by a parent or other person as is known by those skilled in the art.

Figure 3:
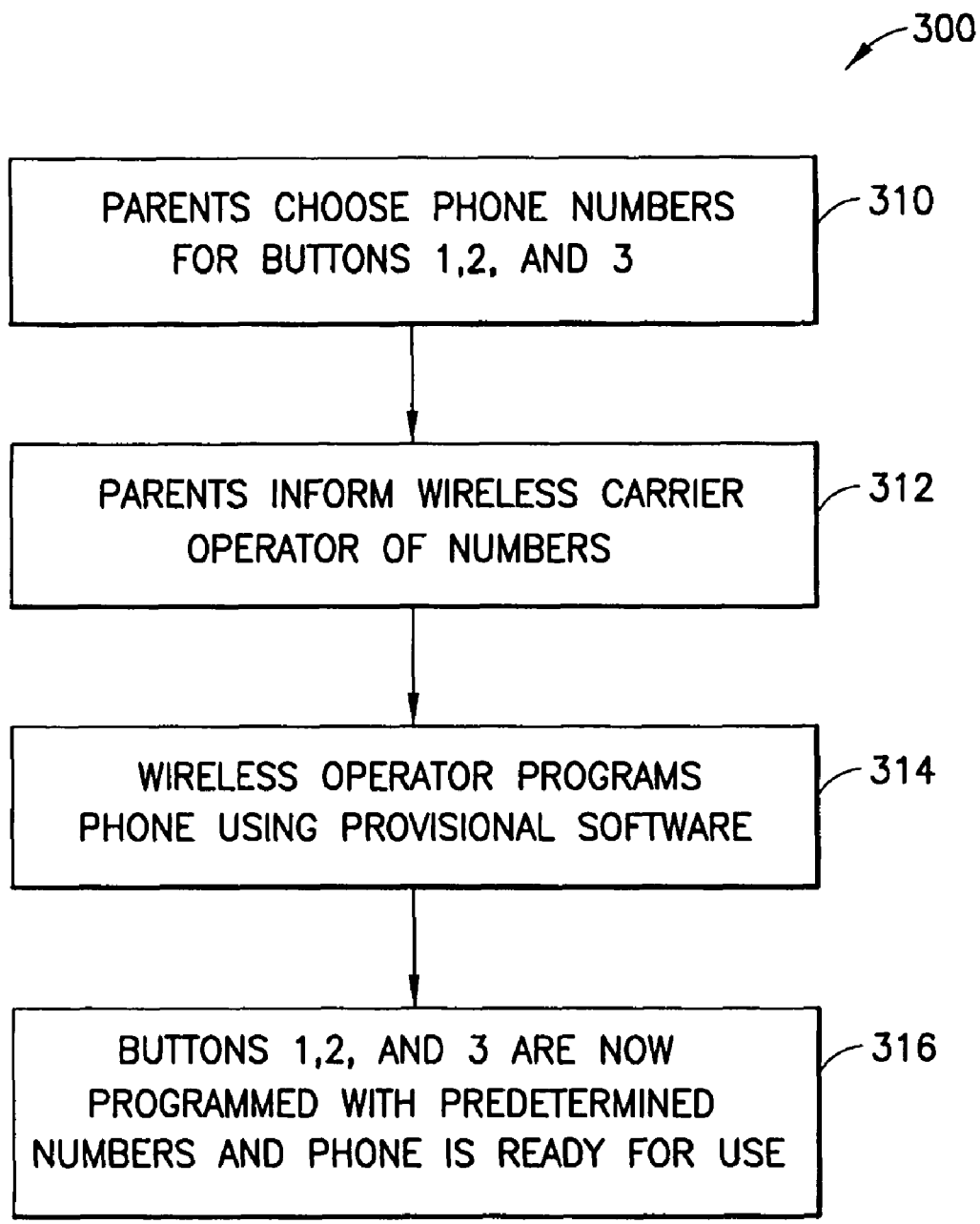
FIG. 3 is an illustrative exemplary flow diagram of a process of configuring a wireless communication device.

With reference to FIG. 3, there is shown a flow diagram illustrating an exemplary method for programming contact buttons 110, 112, 114. First, a parent may enter a phone number, depending on which contact button the parent wishes to program. In this step, each button may have its own dedicated phone number and the parent dials the respective phone number of the contact number to be programmed, as is shown in step 310. Alternatively, the system may be configured such that a single phone number is dialed and the parent chooses via a touch-tone directory, which contact button will be programmed.

Next, the parent may inform a wireless carrier operator or other entity of the particular contact number to be associated with the particular contact button, as is shown in step 312. This step of informing of the phone number may be accomplished by speaking with a person, or may be executed via an automated touch-tone system or other such system as is known to those skilled in the art.

Next, the wireless operator or other such entity configures wireless communications device 100 using an automated software system to relay the programming number via wireless communication to wireless communications device 100, as is shown in step 314.

Next, as a result of the previously discussed steps, contact buttons 110, 112, and 114 may be programmed with predetermined phone numbers such that a child may use wireless communications device 100 to contact a parent or home or other preselected location, as is shown in step 316. This process may be performed repetitively, such that the buttons on wireless communication device 100 may be reprogrammed in accordance with the contact numbers of the parents or other such responsible person.

Figure 4:
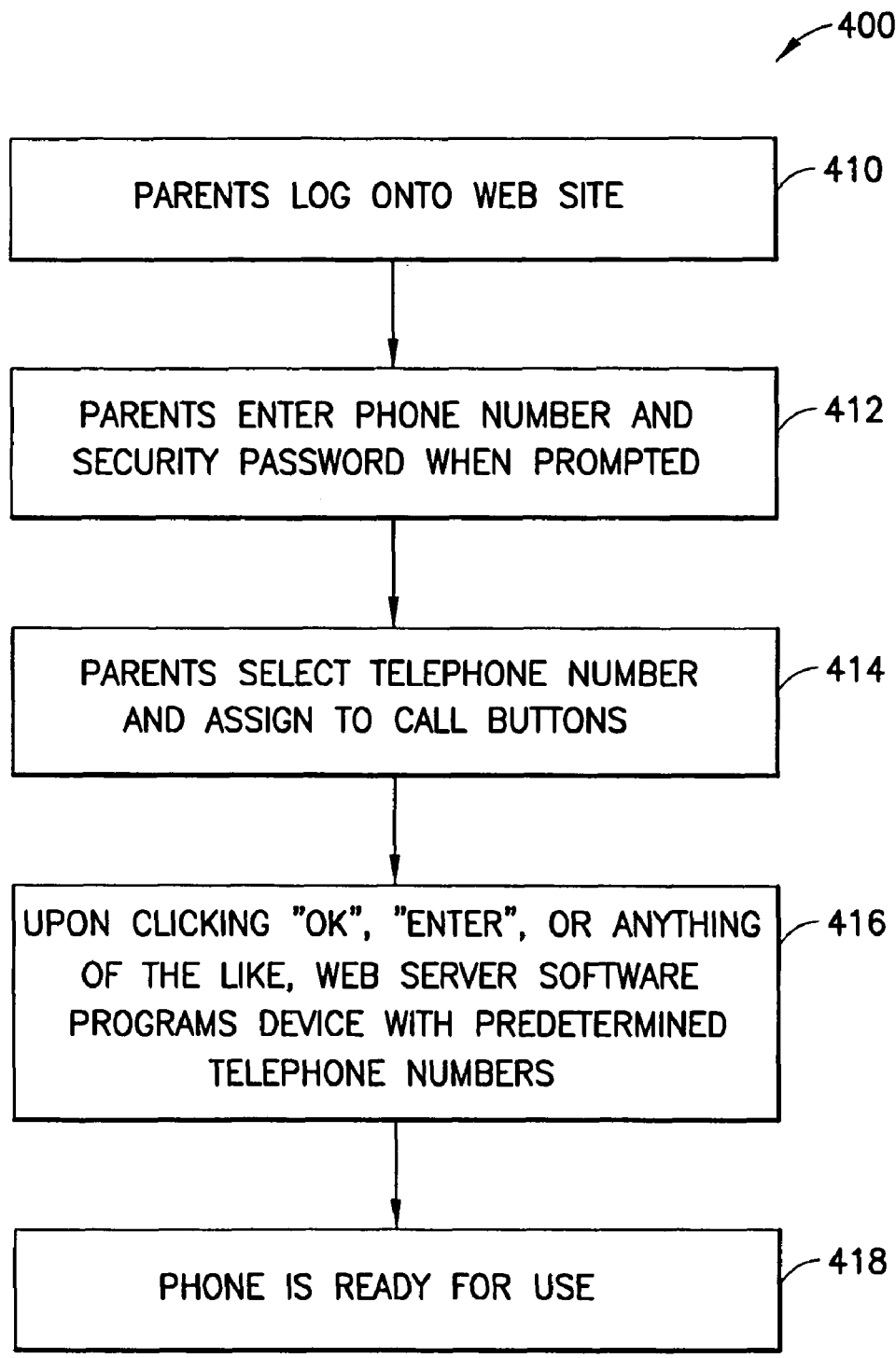
FIG. 4 is an illustrative exemplary flow diagram of another process of configuring a wireless communication device.

With reference to FIG. 4, there is shown a method 400 for programming the contact buttons 110, 112, 114 of wireless communications device 100 from a computer via the Internet.

First, the parents may log onto an appropriate Web site in a process that is commonly known via a Web browser on a computer connected to the Internet in step 410. Next, a series of prompts and input fields on the Web page may allow the parent to enter a specific security password to both allow access to the system and associate the configuration data with their child's particular phone in step 412. Next, the parents may, through mouse clicks or other means, select fields associated with each one of contact buttons 110, 112, 114 and enter in the appropriate contact numbers to be dialed in step 414. Next, upon confirming that the numbers entered are correct, the user may click on an "Enter" or "OK" button and the appropriate numbers are wirelessly communicated to wireless communications device 100 such that wireless communication device 100 is programmed with the appropriate contact numbers in step 416. After this process has finished, wireless communications device 100 is then ready for use as is shown in step 418.

Figure 5:
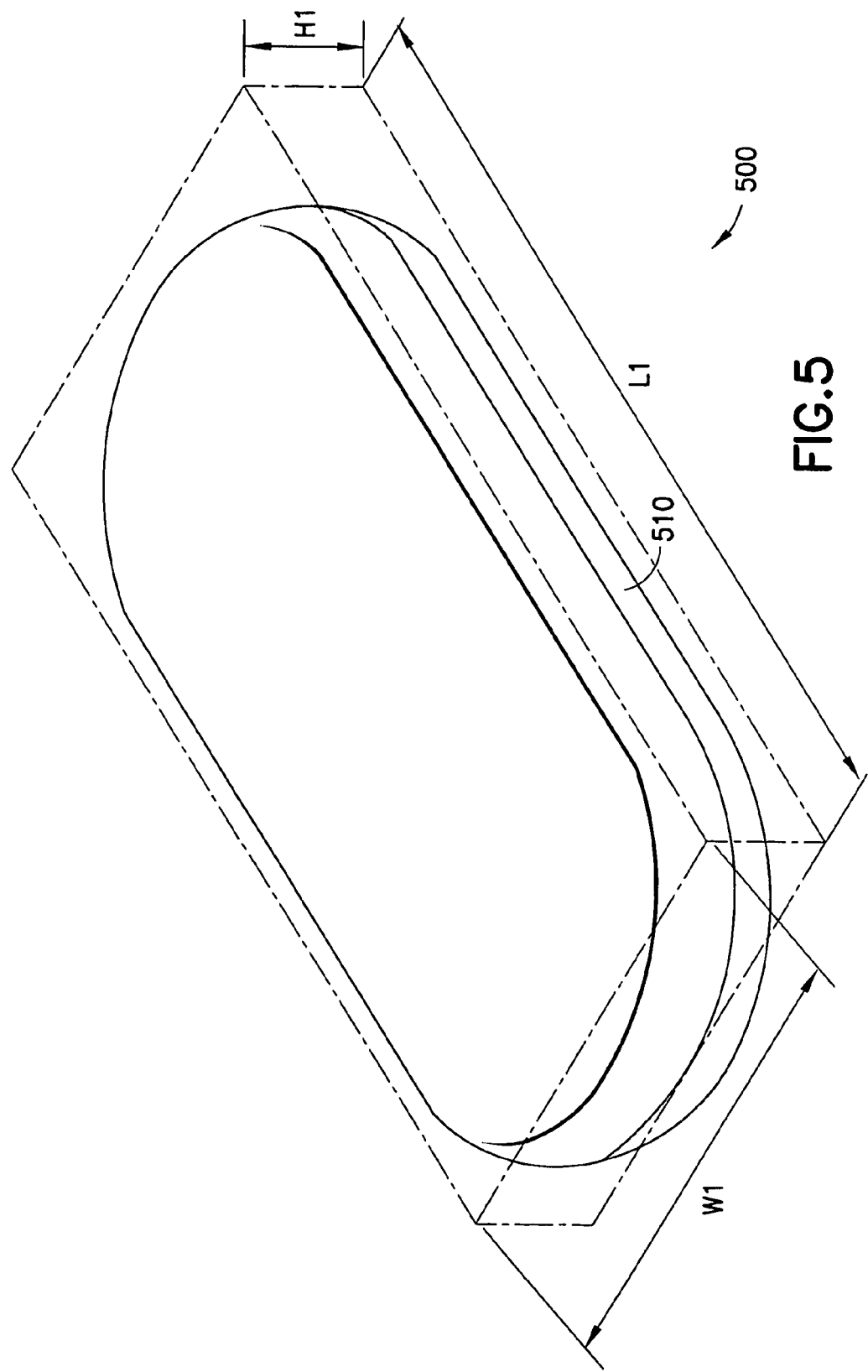
FIG. 5 is a perspective view of an embodiment of a wireless communication device.

With reference to FIG. 5, there is shown a perspective view of an embodiment of a wireless communications device 500 made in accordance with the present invention. Wireless communications device 500 is preferably designed such that it may be easily held and used by a child and specifically a small child. Wireless communications device 500 may have a body 510 shaped and contoured for easy gripping by the hands of a child. Wireless communications device 500 may have a height H1 preferably in the range of 0.25 to 1 inch, and more preferably about 0.531 inches. An embodiment of wireless communications device 500 may have a width W1 preferably in the range of 1 to 2 inches, and more preferably about 1.5 inches. Wireless communications device 500 may have a length preferably in the range of 2.5 to 3.5 inches, and more preferably about 3.079 inches.

Figure 6:
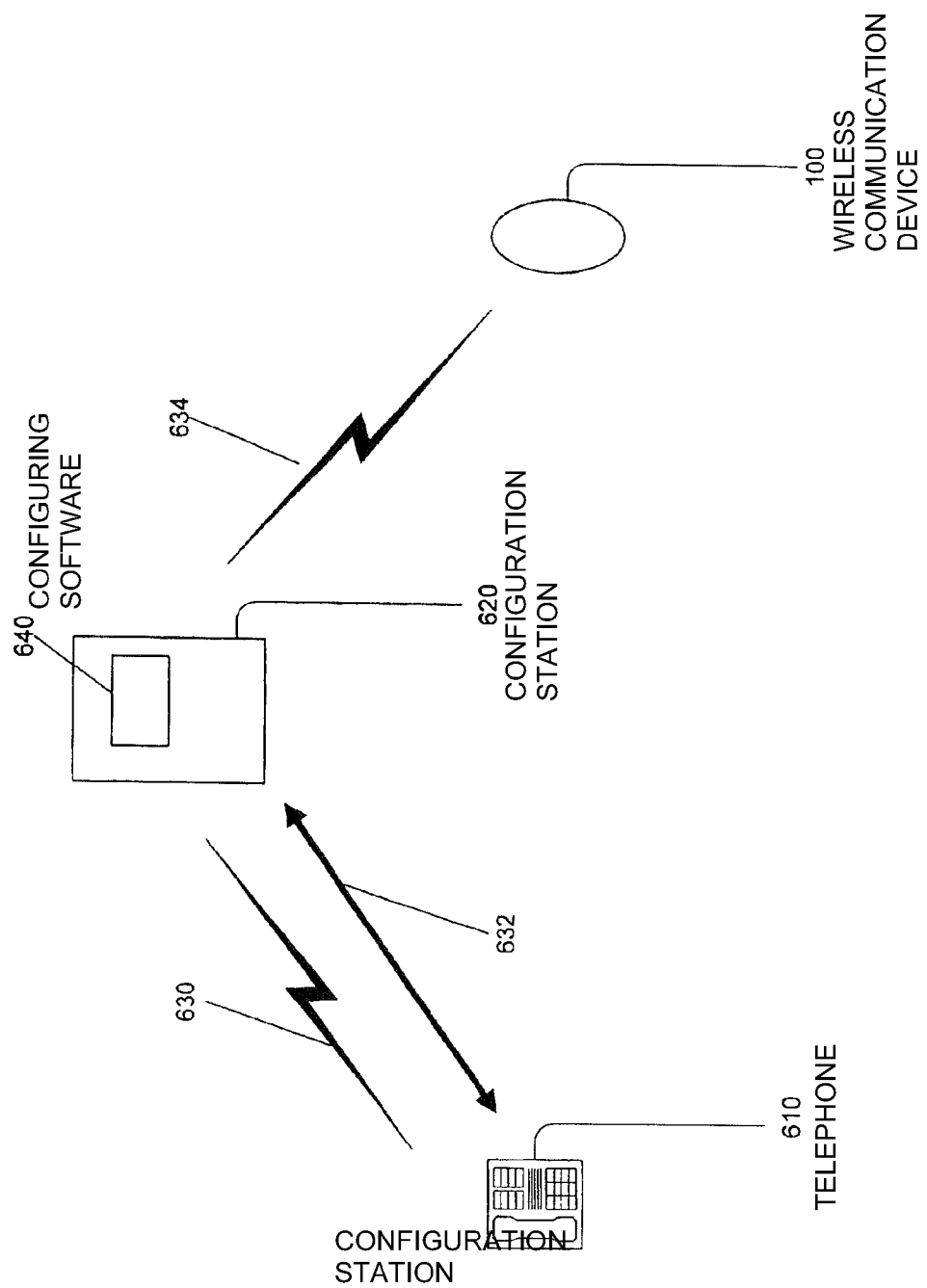
FIG. 6 is a block diagram of a system for configuring a wireless communication device.

Turning to FIG. 6, there is shown a block diagram of a system for configuring a wireless communication device 100 by a parent, as described above. The parent accesses a phone 610, and calls a designated number for configuration station 620. Telephone 610 may contact configuration station 620 either via wireless communication path 630, or via wired communication path 632, in accordance with the specific type of telephone 610 used.

A configuration signal is then transmitted via wireless communication path 634 to wireless communication device 100, thus configuring the contact buttons on wireless communication device 100 for the appropriate contact numbers.

In an embodiment, the parent may forward the contact number configuration information by speaking with a person at the configuration station 620. In another embodiment, the parent may forward the contact number configuration information by way of a touch-tone menu as is known in the art. In either case, configuration of wireless communication device 100 may be facilitated by configuring software 640, which resides at configuration station 620. A password will ordinarily be required to program the wireless communication device via telephone.

Figure 7:
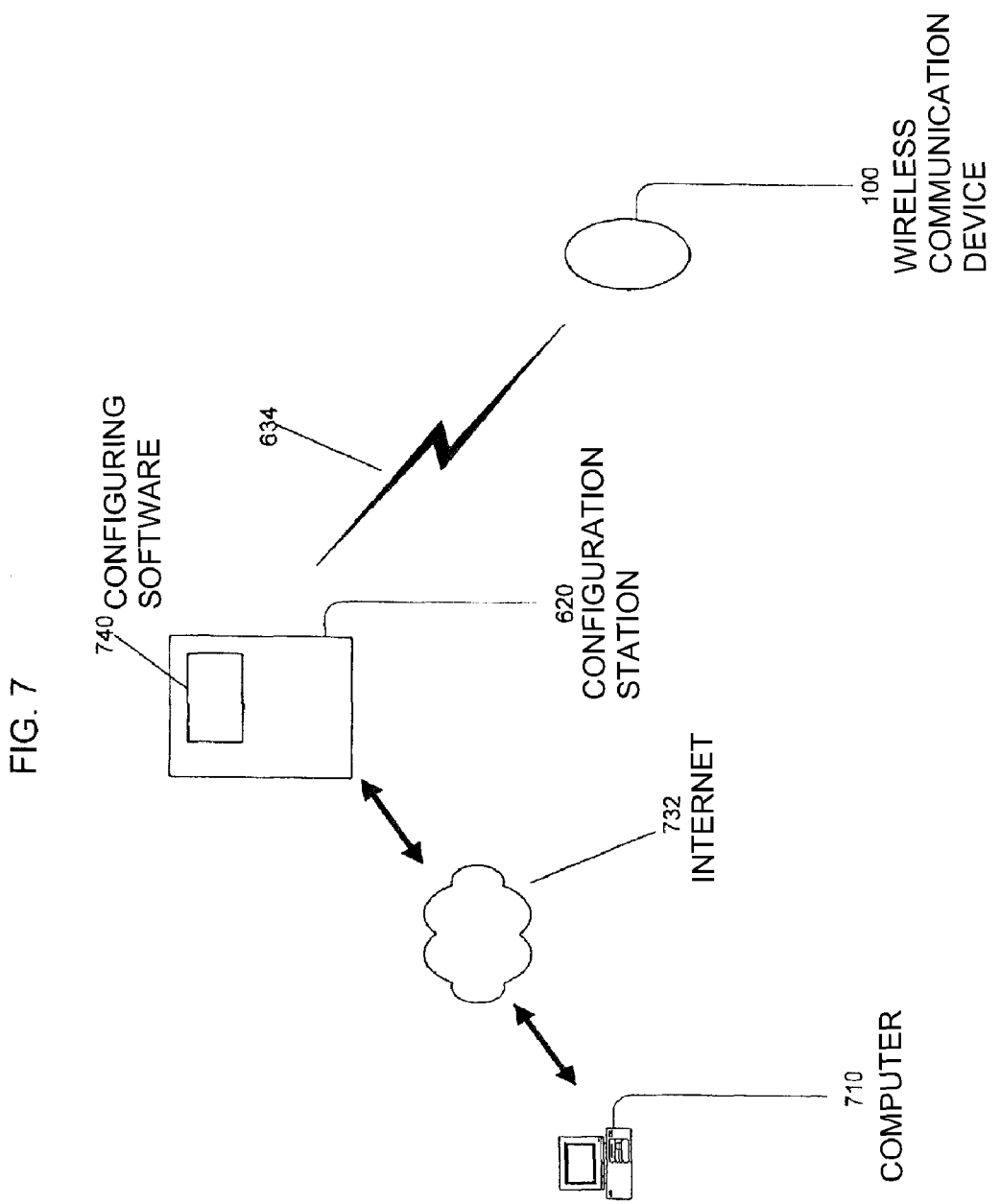
FIG. 7 is a block diagram of another system for configuring a wireless communication device.

Turning to FIG. 7, there is shown a block diagram of another system for configuring a wireless communication device 100 by a parent, as described above. The parent accesses a computer 710 connected to the Internet. The parent accesses a Web site related to configuration station 620 via the Internet over communication path 732. The appropriate contact information is entered into the pages of the Web site, as is described in more detail below.

A configuration signal is then transmitted via wireless communication path 634 to wireless communication device 100, thus configuring the contact buttons on wireless communication device 100 for the appropriate contact numbers.

Figure 8:
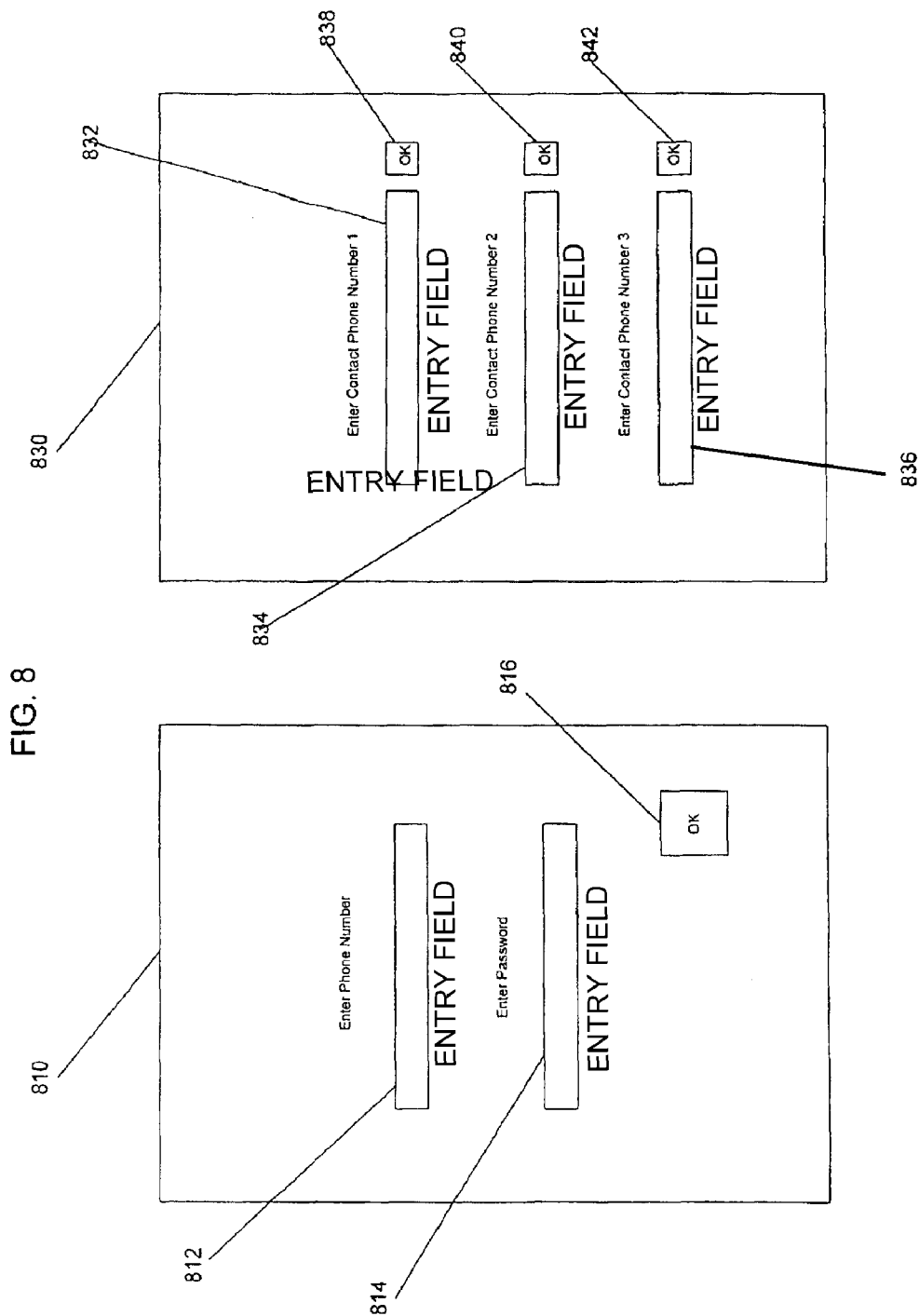
FIG. 8 is a diagram depicting illustrative screen shots for configuring a wireless communication device.
Figure 9:
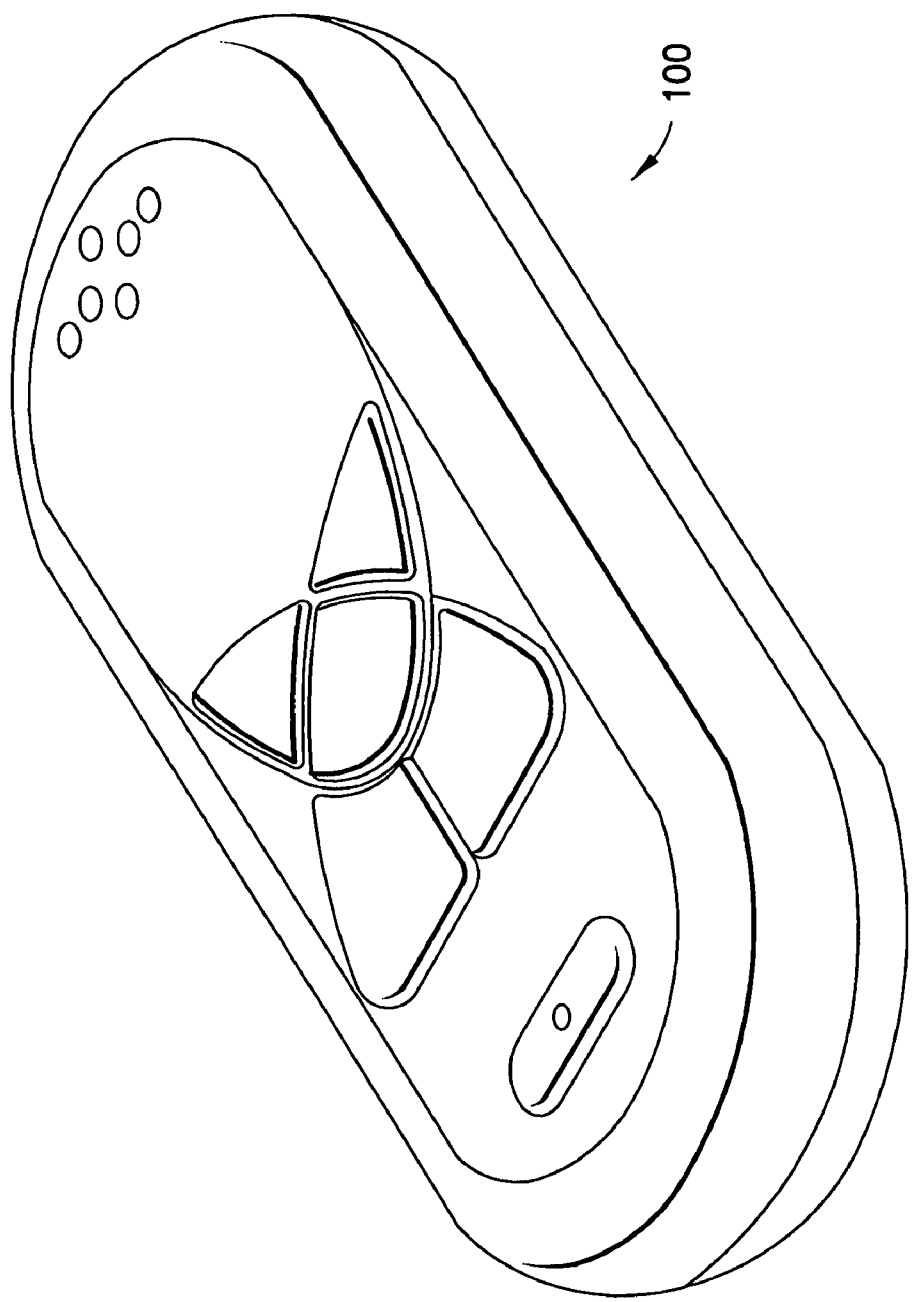
FIG. 9 is a perspective view of an exemplary embodiment of a wireless communication device.
Figure 10:
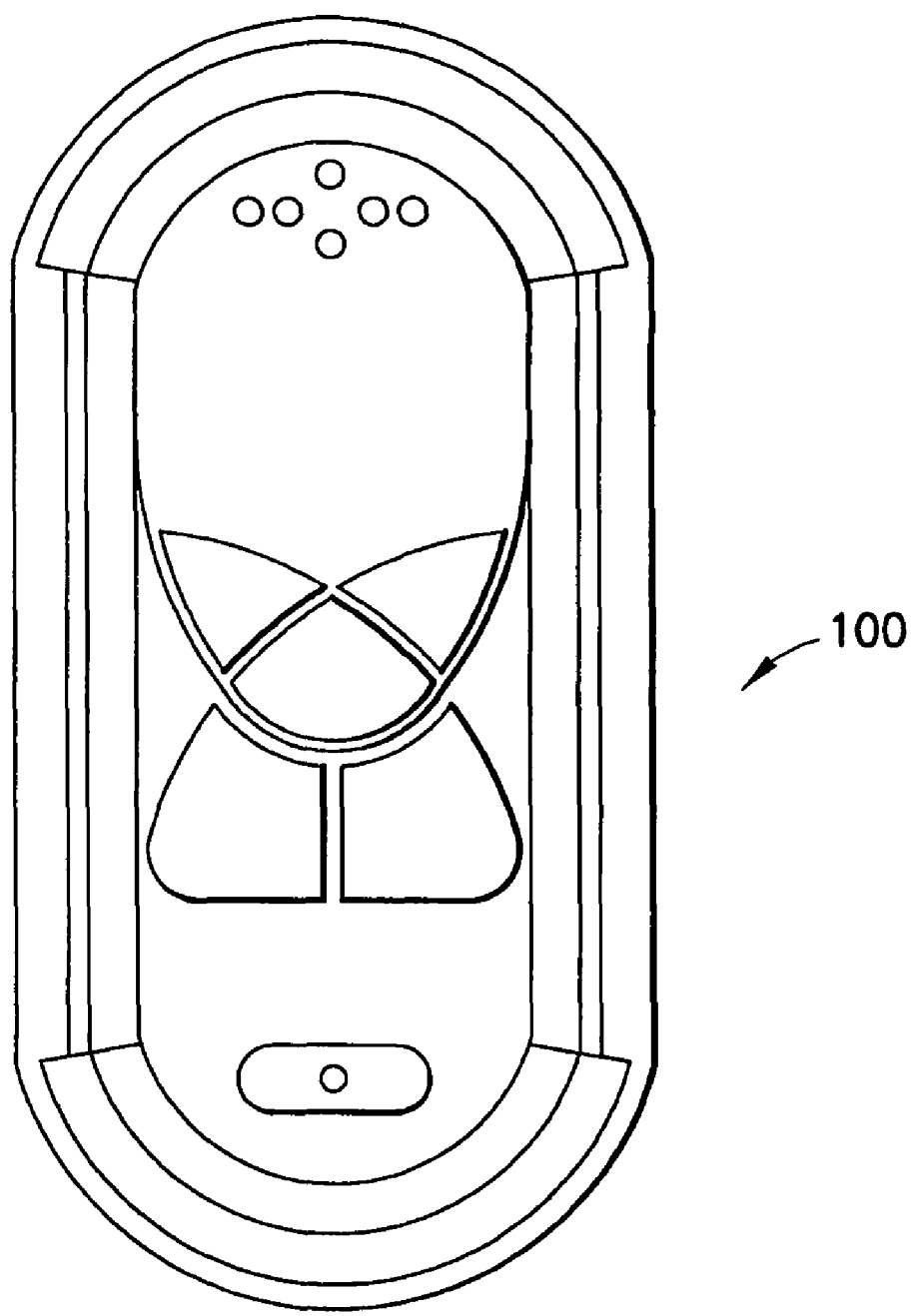
FIG. 10 is a top view of an exemplary embodiment of a wireless communication device.

With reference to FIG. 8, there are shown two illustrative Web pages 810, 830 for the entry of configuration information by a parent, in accordance with an embodiment of the present invention. Web page 810 may have phone number entry field 812. A parent may access Web page 810, and enter the phone number (or other appropriate identification information such as a serial number, name of the child, social security number, etc.) of the phone to be configured. The parent next enters a security password into enter password field 814. After the appropriate information has been entered, the parent actuates the "OK" button to gain entry to the appropriate configuration Web page 830.

Web page 830 may have various fields 832, 834, 836 for entering contact number information for the parent(s) or other contact number/location. When these fields have been satisfactorily filled in, the respective update or "OK" buttons 838, 840, 842 may be actuated to configure the appropriate contact information to be transmitted to wireless communication device 100.

Alternatively, as will be appreciated by persons skilled in the art, the wireless communication device can be programmed through a serial connection to a personal computer or by use of a menu on the wireless communication device itself.

Figures 11, 12:
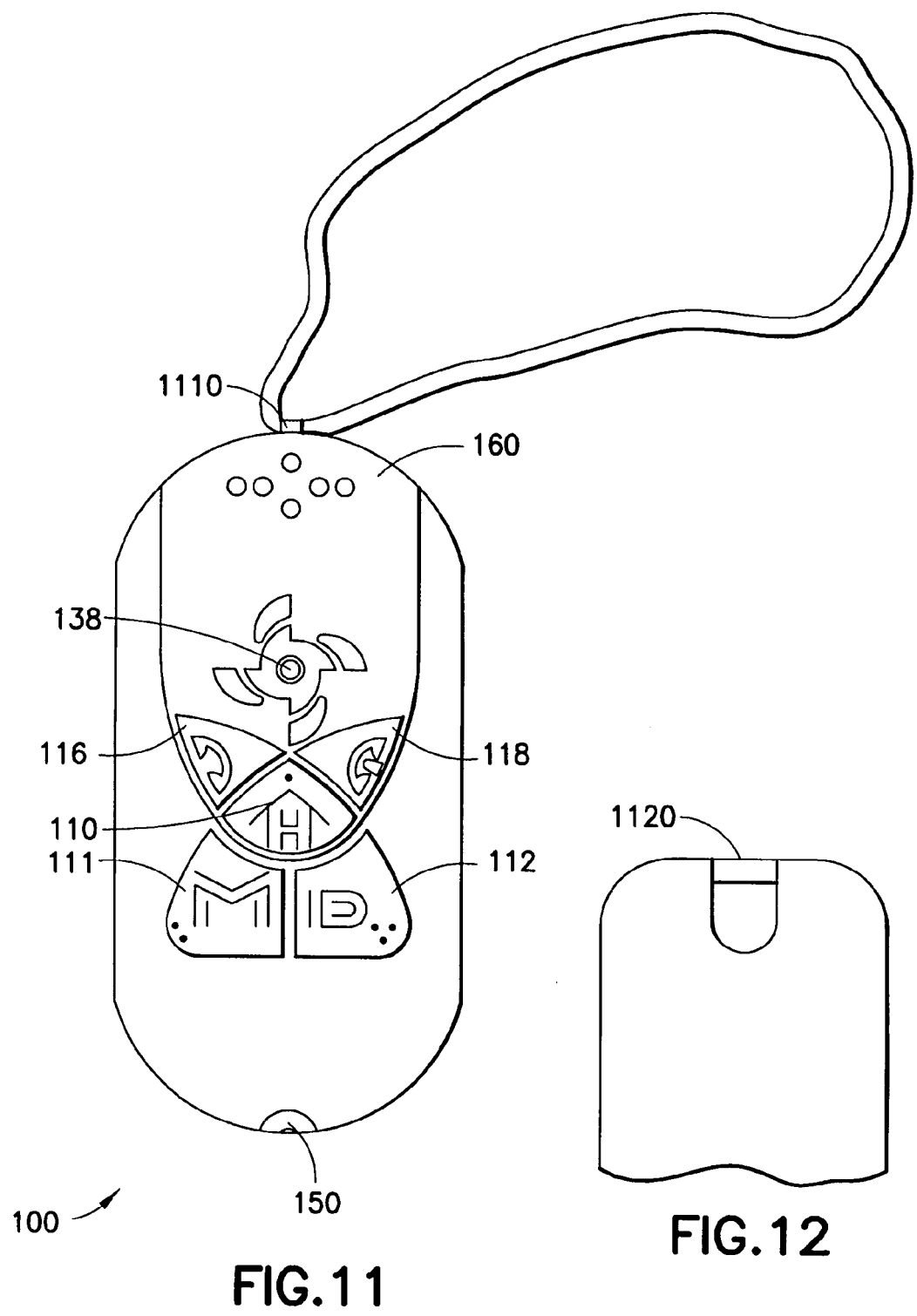
FIG. 11 is a top view of an exemplary embodiment of a wireless communication device.
FIG. 12 is a bottom view of an exemplary embodiment of a wireless communication device.
Figure 13:
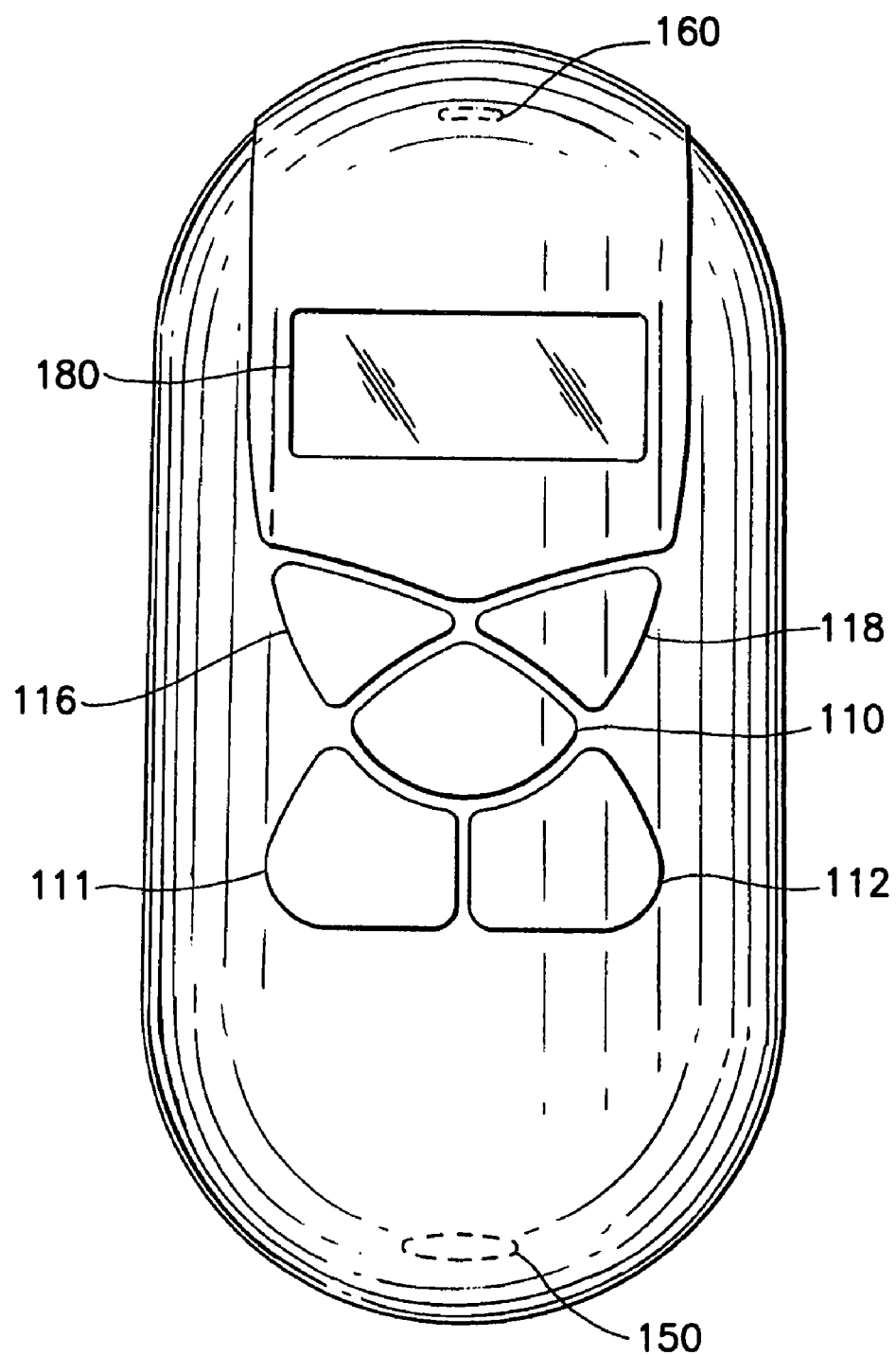
FIG. 13 is a front view of an exemplary embodiment of a wireless communication device.
Figure 15:
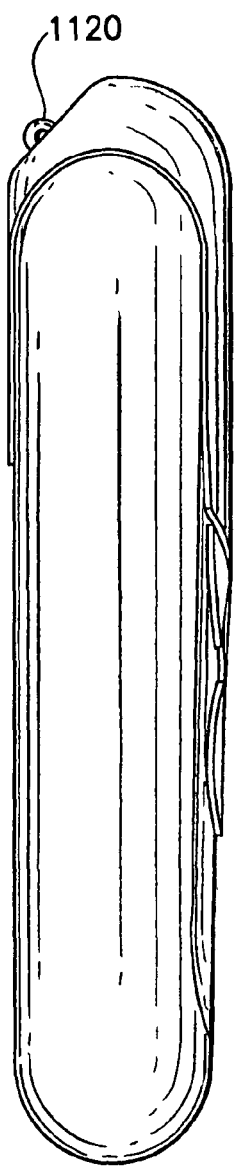
FIG. 15 is a side view of an exemplary embodiment of a wireless communication device.
Figure 14:
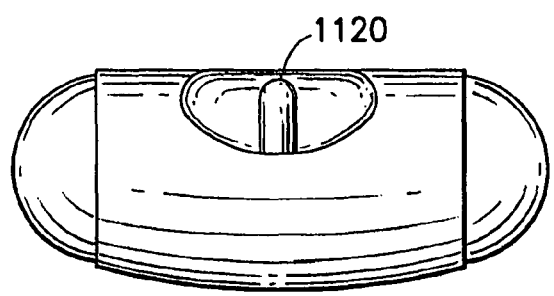
FIG. 14 is a top view of an exemplary embodiment of a wireless communication device.
Figure 17:
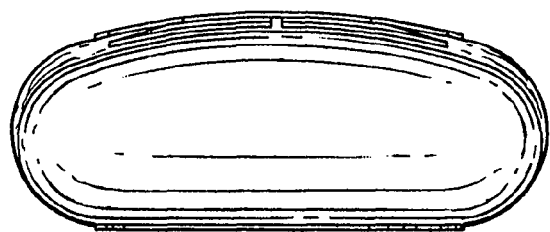
FIG. 17 is a bottom view of an exemplary embodiment of a wireless communication device.
Figure 16:
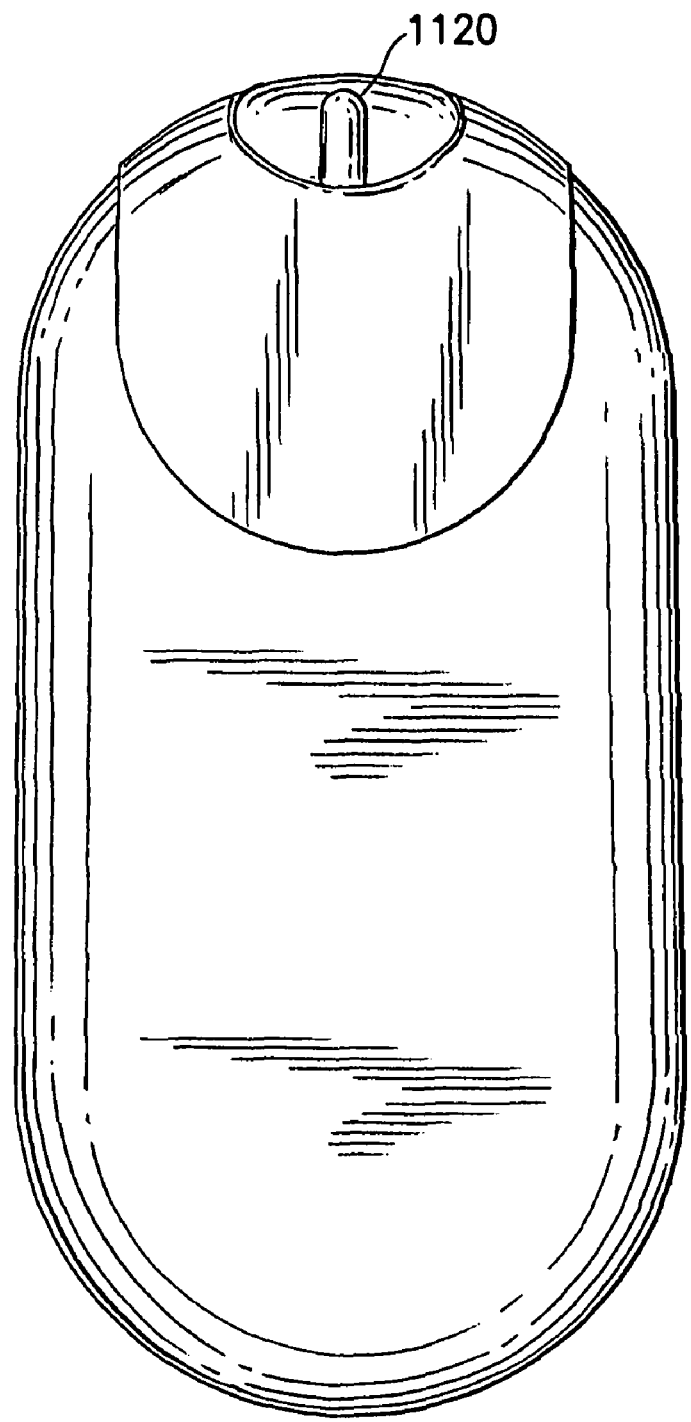
FIG. 16 is a back view of an exemplary embodiment of a wireless communication device.

With reference to FIGS. 9-17, there is shown an exemplary embodiment of the present invention. As discussed above, wireless communication device 100 may have Home button 110, Mom button 110, and Dad button 112 presented in a button set arranged in a generally coplanar orientation. The physical locations of other features in this embodiment of the invention are also shown, such as Send (or Talk) button 116, End button 118, microphone 150, display 180, speaker 160 and power light 138. An embodiment of the present invention may also have retention strap 1110 attachable to wireless communication device 100 by way of connector 1120. Limiting buttons to less than the ten or more keys found with prior art devices, as illustrated in FIGS. 9-17, limits confusion by users such as children. It is particularly desirable to limit the number of contact buttons to three (or less) such as, by way of example Home button 110, Mom button 110, and Dad button 112 (FIG. 11).

In use, a child may take wireless communications device 100 along with him or her to school or to other activities. If the child is lost, or needs to be picked up or is injured, or otherwise needs the help of a parent or adult, the child may push one of the appropriate contact buttons 110, 112, 114, press the Send button and be wirelessly in communication with a parent or other person at the child's home. Likewise, if a parent needs to contact the child, the parent may call the child's cellular communication device and the child can answer the call by pressing the Send button to communicate with the parent. A call is terminated by pressing the End button. If a parent wants to change a contact number while located remotely from the child and the wireless communications device 100, the parent only need dial the phone number, or access a Web site, as described above and change and update the number.

A benefit of the present invention is that a child may easily dial and communicate with a parent without need to remember a phone number, or to determine which of a large number of buttons to press. Furthermore, even though only a few buttons need be used, the child may have voice communications with the parent or other person such that false alarms may be communicated, and non-emergency communications may be facilitated without overreaction by any of the parties.

A number of features can be incorporated into the wireless communication device described herein to facilitate use by a child. For example, the wireless communication device may incorporate features which indicate to the child the origin of an incoming call or the recipient of the outgoing call. Thus, for incoming calls, various ring tones can be used with the cellular communication device. A first ring tone can be used if an incoming call is from the number associated with the Mom button, a second ring tone can be used if the incoming call is from the number associated with the Home button, a third ring tone can be used if the incoming call is from the number associated with the Dad button and a fourth ring tone can be used if the incoming call is from a number that does not match any of the numbers associated with the buttons on the wireless communication device. In addition, the display may also indicate Mom, Dad or Home with respect to calls being received from the numbers associated with the Mom, Dad or Home buttons on the cellular communication device.

Likewise, the wireless communication device may be fitted with indicator light which glows (e.g. blinks) a color specific to each outgoing call button. Thus, a green indicator light can glow to indicate that an outgoing call is being placed to the number associated with the Mom button, an orange indicator light can glow to indicate that a call is being placed to the number associated with the Dad button, a blue indicator light can glow to indicate that an outgoing call is being placed to the number associated with the Dad button and a red indicator light can glow to indicate that an outgoing call is being placed to 911. In addition, the words Mom, Dad or Home can appear on the display to indicate the number to which an outgoing call is being placed. The indicator light can also be used to indicate the origin of incoming calls or can be randomly cycled through all available colors when a call is incoming or if an incoming call does not correspond to any of the numbers associated with the buttons on the phone.

The various ring tones and indicator light colors may also be programmed remotely (as described with respect to programming of the contact buttons with reference to FIGS. 3, 4 and 6-8) through a serial connection to a personal computer or by use of a menu on the wireless communication device itself. However, programming of the ring tones and indicator lights need not require entry of a password and hence can be done by the child user of the wireless communication device.

The cellular communication device can also incorporate call waiting. This could be activated by the child by pressing the Send button when, during a cellular communications call, an audible or visual indication is given that a second call is being received. A number of calling options that are standard on cellular telephones, for example, call forwarding, three way calling, call hold and auto answer, are to difficult for a child to use and are not incorporated in the preferred embodiment.

While the present invention has been described in reference to use by children, the present invention may also be used with elderly persons, or with persons whose capacities may require the type of assistance provided by the present invention.

Furthermore, while the present invention has been described with reference to contact persons such as parents, the present invention may also be used with other contact persons such as, by way of non-limiting example, school supervisors, caregivers, nurses, and the like.

While the invention has been described in connection with preferred embodiments, it will be understood that modifications thereof within the principles outlined above will be evident to those skilled in the art and thus, the invention is not limited to the preferred embodiments but is intended to encompass such modifications.

What is claimed:

1. A wireless communication device, comprising:
a microprocessor;
a memory device electrically connected to the microprocessor;
a button set arranged in a generally coplanar orientation; said button set including a maximum of three discrete contact buttons connected to the microprocessor;
a plurality of discrete communications buttons connected to the microprocessor; the plurality of communications buttons responding to pressing to affect communication operations of the wireless communication device; and
at least one indicator light connected with the microprocessor; said at least one indicator light presenting information relating to an extant communication with a respective predetermined party during at least a portion of a time employed effecting the extant communication;
each respective contact button of said maximum of three contact buttons being configured for responding to pressing to cooperate with pressing at least one communication button of the plurality of communications buttons for effecting communication with a respective predetermined party; contact information for each respective predetermined party being stored in the memory device; one button of said plurality of communications buttons being an emergency contact button configured for effecting emergency dialing; said emergency dialing being initiated only when at least one communications button of said plurality of communications buttons is held pressed while said emergency contact button is held pressed.

2. The wireless communication device of claim 1, wherein the contact information for each contact button of said plurality of contact buttons may be changed in the memory device from a location remote from the wireless communication device.

3. A wireless communication device, comprising:
a microprocessor;
a memory device electrically connected to the microprocessor;
a button set arranged in a generally coplanar orientation; said button set including a predetermined plurality of discrete contact buttons comprising only a first discrete contact button, a second discrete contact button and a third discrete contact button;
a plurality of discrete communications buttons; the plurality of discrete communications buttons including a discrete send button; the plurality of discrete contact buttons and the plurality of discrete communications buttons being electrically connected to the microprocessor; the plurality of discrete communications buttons responding to pressing to affect communication operations of the wireless communication device; and
at least one indicator light connected with the microprocessor; said at least one indicator light presenting information relating to an extant communication with a respective predetermined party during at least a portion of a time employed effecting the extant communication;
each respective discrete contact button of the plurality of discrete contact buttons being configured for responding to pressing to cooperate with pressing at least one discrete communication button of the plurality of discrete communications buttons for effecting communication with a respective predetermined party; contact information for each respective predetermined party being stored in the memory device; the discrete send button responding to pressing to effect initiation of a call to a particular respective predetermined party identified by a particular respective contact button; one button of said plurality of discrete communications buttons being a discrete emergency contact button configured for effecting emergency dialing; said emergency dialing being initiated only when at least one discrete communications button of said plurality of discrete communications buttons is held pressed while said discrete emergency contact button is held pressed.

4. The wireless communication device of claim 3, wherein the contact information for each contact button of said plurality of contact buttons may be changed in the memory device from a location remote from the wireless communication device.

5. A wireless communication device, comprising:
a microprocessor;
a memory device electrically connected to the microprocessor;
a button set arranged in a generally coplanar orientation; said button set including a predetermined plurality of discrete contact buttons comprising only a first discrete contact button, a second discrete contact button and a third discrete contact button;
one indicator light coupled with at least one discrete contact button of said predetermined plurality of discrete contact buttons;
a plurality of discrete communications buttons; the plurality of discrete communications buttons including a discrete send button; the plurality of discrete contact buttons and the plurality of discrete communications buttons being electrically connected to the microprocessor; the plurality of discrete communications buttons affecting communication operations of the wireless communication device; and
a display unit; said display unit presenting information relating to an extant communication with a respective predetermined party during at least a portion of a time employed effecting the extant communication;
each respective discrete contact button of the plurality of discrete contact buttons being associated with a respective predetermined party and being configured for responding to pressing to cooperate with pressing the discrete send button for initiating communication with the respective predetermined party; contact information for each respective predetermined party being stored in the memory device; each respective discrete contact button being related with a respective color being displayed by said one indicator light during at least a portion of a call involving the respective predetermined party associated with the respective discrete contact button; one button of said plurality of discrete communications buttons being a discrete emergency contact button configured for effecting emergency dialing; said emergency dialing being initiated only when at least one discrete communications button of said plurality of discrete communications buttons is held pressed while said discrete emergency contact button is held pressed.

6. The wireless communication device of claim 5, wherein the contact information for each discrete contact button of said plurality of discrete contact buttons may be changed in the memory device from a location remote from the wireless communication device.

* * * * *